US012664920B2

(12) United States Patent
Yoo et al.

(10) Patent No.: US 12,664,920 B2
(45) Date of Patent: Jun. 23, 2026

(54) DISPLAY DRIVING IC DEVICE AND PROBE TEST METHOD USING THE SAME

(71) Applicant: MagnaChip Semiconductor, Ltd., Cheongju-si (KR)

(72) Inventors: Dae Young Yoo, Cheongju-si (KR); Hyoung Kyu Kim, Cheongju-si (KR); Yun Yeong Park, Cheongju-si (KR); Sang Ho Lee, Cheongju-si (KR)

(73) Assignee: MagnaChip Semiconductor, Ltd., Cheongju-si (KR)

( * ) Notice: Subject to any disclaimer, the term of this patent is extended or adjusted under 35 U.S.C. 154(b) by 0 days.

(21) Appl. No.: 18/340,615

(22) Filed: Jun. 23, 2023

(65) Prior Publication Data

US 2024/0177640 A1 May 30, 2024

(30) Foreign Application Priority Data

Nov. 30, 2022 (KR) ........................ 10-2022-0163735

(51) Int. Cl.
*G09G 3/00* (2006.01)
*G09G 3/20* (2006.01)

(52) U.S. Cl.
CPC ............... *G09G 3/006* (2013.01); *G09G 3/20* (2013.01); *G09G 2310/0291* (2013.01)

(58) Field of Classification Search
CPC .. G09G 3/006; G09G 3/20; G09G 2310/0291; G09G 3/36; G09G 3/32; G09G 2330/12; G01R 31/2825; G01R 31/2839; G01R 31/2844
See application file for complete search history.

(56) References Cited

U.S. PATENT DOCUMENTS 6,191,770 B1 * 2/2001 Kim ..................... G09G 3/3648 324/760.02
11,922,847 B2 * 3/2024 Chen ..................... G09G 3/3225
11,925,010 B2 * 3/2024 Wang ..................... H01Q 1/243
11,928,994 B2 * 3/2024 Lee ..................... G09G 3/006
11,929,005 B2 * 3/2024 Chen ..................... G09G 3/2003
11,935,498 B2 * 3/2024 Chen ..................... G09G 3/3225
11,957,013 B2 * 4/2024 Zhu ..................... H10K 59/131
11,961,432 B2 * 4/2024 Jung ..................... G09G 3/006
11,961,433 B2 * 4/2024 Fang ..................... G09G 3/3688
11,967,259 B2 * 4/2024 Han ..................... G09G 3/3677
12,002,417 B2 * 6/2024 Kim ..................... G09G 3/3275
12,033,549 B2 * 7/2024 Wang ..................... H10K 59/131
12,033,550 B2 * 7/2024 Jee ..................... G09G 3/3208
(Continued)

FOREIGN PATENT DOCUMENTS

KR 10-2021-0132825 A 11/2021

*Primary Examiner* — Jose R Soto Lopez
(74) *Attorney, Agent, or Firm* — NSIP Law

(57) ABSTRACT

A display driving IC includes first channel block to $N^{th}$ channel block each including M source amplifiers, N and M being an integer, source driving pads each connected to the M source amplifiers, a multiplexer configured to alternate data outputs of the source amplifiers or selectively provide a test path so that a probe test is performed on a plurality of source amplifiers for each of the first to $N^{th}$ channel blocks through a test pad selected from the source driving pads, and a control unit configured to control driving of the source amplifiers and multiplexer.

16 Claims, 5 Drawing Sheets

(56) References Cited

U.S. PATENT DOCUMENTS

| | | | | |
|---|---|---|---|---|
| 12,039,906 | B2 * | 7/2024 | Kim | G09G 3/20 |
| 12,089,465 | B2 * | 9/2024 | Kim | H10D 86/441 |
| 12,111,558 | B2 * | 10/2024 | Feng | G02F 1/294 |
| 12,118,907 | B2 * | 10/2024 | Jang | G09G 5/02 |
| 12,131,673 | B2 * | 10/2024 | Piao | G09G 3/006 |
| 12,131,704 | B2 * | 10/2024 | Kim | G09G 3/3208 |
| 12,133,433 | B2 * | 10/2024 | Tang | G09G 3/3216 |
| 12,167,647 | B2 * | 12/2024 | Zhang | H10D 89/931 |
| 12,175,913 | B2 * | 12/2024 | Kim | G09G 3/2092 |
| 12,198,585 | B2 * | 1/2025 | Tamura | G09G 3/3291 |
| 12,198,653 | B2 * | 1/2025 | Lim | G09G 3/3688 |
| 12,205,503 | B2 * | 1/2025 | Lee | G09G 3/006 |
| 12,217,640 | B2 * | 2/2025 | An | G09G 3/006 |
| 12,223,925 | B2 * | 2/2025 | Liu | G09G 3/20 |
| 12,230,178 | B2 * | 2/2025 | Yamamoto | G09G 3/006 |
| 12,230,190 | B2 * | 2/2025 | Morris | G09G 3/32 |
| 12,230,640 | B2 * | 2/2025 | Liu | H10D 86/441 |
| 12,232,376 | B2 * | 2/2025 | Yi | G09G 3/006 |
| 12,236,817 | B2 * | 2/2025 | Oh | H10D 86/441 |
| 12,236,839 | B1 * | 2/2025 | Kim | G09G 3/2092 |
| 12,236,898 | B2 * | 2/2025 | Kim | G09G 3/3266 |
| 12,266,297 | B1 * | 4/2025 | Zhong | G09G 3/3233 |
| 12,276,887 | B2 * | 4/2025 | Liu | H10D 86/441 |
| 12,300,133 | B2 * | 5/2025 | Wang | G09G 3/3648 |
| 12,347,369 | B2 * | 7/2025 | Wang | G09G 3/3233 |
| 12,408,287 | B2 * | 9/2025 | Harvey | H05K 7/1465 |
| 12,449,931 | B2 * | 10/2025 | Lee | G06F 3/04182 |
| 12,462,718 | B2 * | 11/2025 | Lee | G09G 3/006 |
| 12,475,841 | B2 * | 11/2025 | Kim | G09G 3/3208 |
| 12,484,403 | B2 * | 11/2025 | Ma | H10K 77/111 |
| 12,488,760 | B2 * | 12/2025 | Lu | G09G 3/3266 |
| 12,505,810 | B2 * | 12/2025 | Kim | G09G 3/32 |
| 12,518,666 | B2 * | 1/2026 | Ye | G09G 3/006 |
| 12,518,716 | B2 * | 1/2026 | Kim | G09G 3/3677 |
| 12,525,172 | B2 * | 1/2026 | Jang | G09G 3/32 |
| 12,548,518 | B2 * | 2/2026 | Kim | G09G 3/3233 |
| 12,557,504 | B2 * | 2/2026 | Kim | H10K 59/131 |
| 12,562,116 | B2 * | 2/2026 | Wang | G09G 3/3233 |
| 12,578,815 | B2 * | 3/2026 | Qu | G06F 3/04164 |
| 12,578,828 | B2 * | 3/2026 | Kim | G06F 3/0446 |
| 2003/0098859 | A1 * | 5/2003 | Udo | G09G 3/006<br>345/204 |
| 2009/0085937 | A1 * | 4/2009 | Woo | G09G 3/3688<br>345/690 |
| 2016/0055803 | A1 * | 2/2016 | Kim | G09G 3/3233<br>345/691 |
| 2016/0379906 | A1 * | 12/2016 | Kim | G09G 3/3688<br>257/48 |
| 2018/0218665 | A1 * | 8/2018 | Nitobe | G06F 3/0446 |
| 2020/0135070 | A1 * | 4/2020 | Hong | G09G 3/006 |
| 2024/0038144 | A1 * | 2/2024 | Yeo | G09G 3/3275 |

* cited by examiner

DISPLAY DRIVING IC DEVICE AND PROBE TEST METHOD USING THE SAME

CROSS-REFERENCE TO RELATED APPLICATIONS

This application claims the benefit under 35 U.S.C. 119(a) of Korean Patent Application No. 10-2022-0163735 filed on Nov. 30, 2022 in the Korean Intellectual Property Office, the entire disclosure of which is incorporated herein by reference for all purposes.

BACKGROUND

1. Field

The following description relates to a display driving IC device capable of performing a probe test with a small number of measurement units provided in a test equipment.

2. Description of Related Art

A display device includes a display panel, such as an LCD panel or an LED panel, and a display driving IC for driving the display panel. The display driving IC is connected to each channel of the display panel and transmits data signals for images to be displayed on the display panel.

These display driving ICs include an input pad for receiving data to be displayed or inputting voltages and an output pad (i.e., a source driving pad) for outputting source signals. In addition, the display driving ICs are also used during the manufacturing phase of a display device to perform a probe test on the display panel using test equipment. At this time, since the probe test is performed using the source driving pad, the test equipment requires measurement units that correspond to the source driving pad.

Conventionally, probe tests were possible with conventional test equipment for display devices without high resolution. However, recently, display devices have been designed to have much higher resolution than conventional resolutions, and the number of source driving pads is bound to increase accordingly. Therefore, conventional test equipment cannot adequately perform probe tests for recently designed display devices. In other words, it is not possible to test all source driving pads that increase in number with resolution with only an appropriate number of measurement units in the test equipment.

Of course, it is possible to increase the number of measurement units of the test equipment to accommodate the source driving pad, but this can be problematic in that it increases the manufacturing cost of the test equipment.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a display driving IC device includes first channel block to $N^{th}$ channel block each including M source amplifiers, N and M being an integer; source driving pads each connected to the M source amplifiers; a multiplexer configured to alternate data outputs of the source amplifiers or selectively provide a test path so that a probe test is performed on a plurality of source amplifiers for each of the first to $N^{th}$ channel blocks through a test pad selected from the source driving pads; and a control unit configured to control driving of the source amplifiers and the multiplexer.

Test pads of odd channel blocks adjacent to each other among the first to $N^{th}$ channel blocks may be shorted to an exterior of the display driving IC device. Test pads of even channel blocks adjacent to each other among the first to $N^{th}$ channel blocks may be shorted to the exterior of the display driving IC device.

The M may be 4. In test mode, the test pad may be a source driving pad connected to a third source amplifier of each channel block.

Each source amplifier in the first to $N^{th}$ channel blocks may be connected to the test pad sequentially, and the probe test is performed under a control of the multiplexer.

Test pads each may be in contact with measurement units of a test equipment.

One channel block of the short-connected pair of channel blocks may be in an on-state in which test may be performed. The other channel block of the short-connected pair of channel blocks may be in an off-state awaiting testing.

After testing of a source channel provided in one channel block of the short-connected pair of channel blocks is completed, testing of a source channel provided in the other channel block of the short-connected pair of channel blocks may be performed.

The M may be 4, and in normal mode, the source amplifier may alternate data output between adjacent odd source driving pads.

A source amplifier of a channel block being tested may be in a drive-on state. A test pad connected to a source channel of other channel blocks to be untested may maintain a floating state.

When a channel block is in an on-state, the control unit may be configured to control driving of the multiplexer such that a source channel is connected to the test pad.

In another general aspect, a method for performing a probe test using a display driving IC, the method includes: externally shorting test pads of odd channel blocks adjacent to each other among first to $N^{th}$ channel blocks, and externally shorting test pads of even channel blocks adjacent to each other among the first to $N^{th}$ channel blocks; driving-on any one of the shorted pairs of channel blocks; and sequentially testing source channels of the channel blocks that have been driven-on by each measurement unit of a test equipment using a test pad in the corresponding channel block.

A test pad included in a remaining channel block of the shorted pairs of channel blocks may be floated.

The probe test method may further include, when testing is completed for source channels of channel blocks in a drive-on state, driving-on channel blocks including test pads in floating state, and sequentially testing source channels of each channel block using one test pad in the corresponding channel block.

The testing may include performing a test with a measurement unit connected to the test pad while switching and driving a multiplexer of each channel block, and sequentially connecting one test pad and source amplifiers included in each channel block.

In another general aspect, a method for performing a probe test using a display driving IC, the method includes: performing a first test process. The first test process includes, connecting a first measurement unit to a first channel block and a third channel block; connecting a second measurement unit to a second channel block and a fourth channel block; connecting a third measurement unit to a fifth channel block and a seventh channel block; and connecting a fourth measurement unit to a sixth channel block and an eighth channel block; and performing a probe test, by the first to fourth measurement units, on source channels provided in each of the first channel block, second channel block, fifth channel block, and sixth channel block, starting from a first source channel.

The probe test method may further include performing a second test process. The second test process may include, when the first test process is completed, performing a probe test, by the first to fourth measurement units, on source channels provided in each of the third channel block, fourth channel block, seventh channel block, and eighth channel block, starting from a first source channel.

One test pad may be provided for each of the first to eighth channel blocks. Each test pad in the first channel block and the third channel block, the second channel block and the fourth channel block, the fifth channel block and the seventh channel block, and the sixth channel block and the eighth channel block may be externally shorted.

The first test process and the second test process may be performed while sequentially connecting test pads and source amplifiers based on switching and driving of a multiplexer provided in each channel block.

When each source amplifier in the first channel block, second channel block, fifth channel block, and sixth channel block is in a drive-on state, each source amplifier in the third channel block, fourth channel block, seventh channel block and eighth channel block may be in a drive-off state.

When each source amplifier in the third channel block, fourth channel block, seventh channel block, and eighth channel block may be in a drive-on state, each source amplifier in the first channel block, second channel block, fifth channel block, and sixth channel block may be in a drive-off state.

Other features and aspects will be apparent from the following detailed description, the drawings, and the claims.

Figure 1:
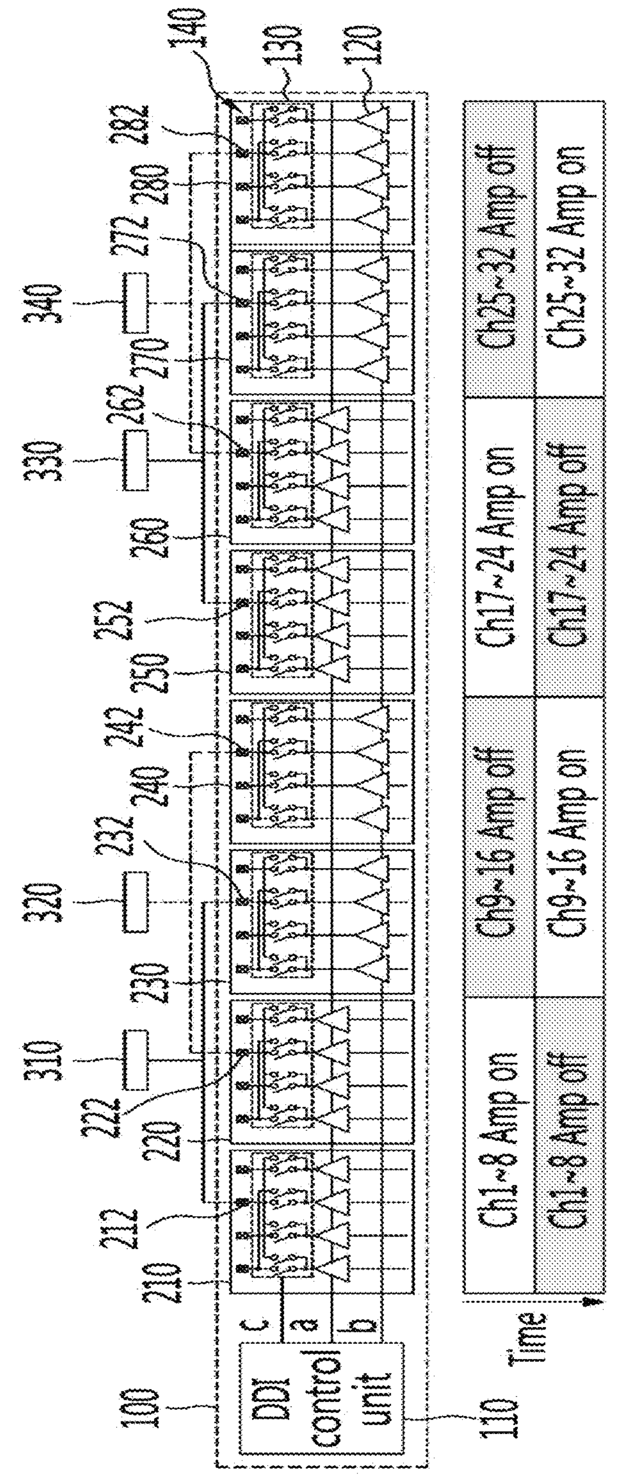
FIG. 1 illustrates a configuration diagram of a display driving IC device according to one or more examples of the present disclosure.

Throughout the drawings and the detailed description, unless otherwise described or provided, the same reference numerals may be understood to refer to the same or like elements. The drawings may not be to scale, and the relative size, proportions, and depiction of elements in the drawings may be exaggerated for clarity, illustration, and convenience.

Other features and aspects will be apparent from the following detailed description, the drawings, and the claims.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

Although terms such as “first,” “second,” and “third” may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles “a,” “an,” and “the” are intended to include the plural forms as well, unless the context clearly indicates otherwise. The terms “comprises,” “includes,” and “has” specify the presence of stated features, numbers, operations, members, elements, and/or combinations thereof, but do not preclude the presence or addition of one or more other features, numbers, operations, members, elements, and/or combinations thereof.

An expression representing a part of the terms such as “part” or “portion” used in the present disclosure may be used herein to describe a device that may include a specific function, software that may include a specific function, or a combination of devices and software that may include a specific function, and is not to be used to limit the described function. This is provided to help a more general understanding of the present disclosure, and various modifications and variations may be made from these descriptions by those of ordinary skill in the field to which the present disclosure belongs.

Additionally, it should be noted that all electric signals used in the present disclosure, as an example, may be reversed in signs of all electric signals to be described below when an inverter or the like is additionally provided in the circuit of the present disclosure. Therefore, the scope of the claims of the present disclosure is not limited to the direction of the signal.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, the present disclosure is described in more detail based on the example illustrated in the drawings.

The following description is to solve the above-mentioned problems, and provides a display driving IC device capable of performing a probe test on a display panel with high resolution using a limited number of measurement units and a probe test method using the same.

The technical problems of the present disclosure are not limited to the technical problems mentioned above, and other technical problems not mentioned will be clearly understood by those skilled in the art from the following description.

FIG. 1 illustrates a configuration diagram of a display driving IC device (hereinafter referred to as DDI device) according to an example of the present disclosure. A DDI device 100 according to one or more examples is configured to test a total of 32 source channels, and it is exemplified that a total of eight channel blocks (first to eighth channel blocks) 210~280 are configured by using four source channels as one channel block.

As illustrated in FIG. 1, the DDI device 100 includes a DDI control unit 110, a source amplifier 120, a multiplexer (MUX) 130, and a source driving pad 140. Although described later, the source amplifier, the MUX, and the source driving pad are identically configured for each of the channel blocks 210 to 280. Also, each source channel may include the source amplifier, source driving pad, and MUX. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

In an example, the DDI control unit 110 is configured to control driving of the source amplifier 120 to be on/off by outputting a first control signal AMP_on_A and a second control signal AMP_on_B. In FIG. 1, the first control signal is simply indicated as 'a' and the second control signal as 'b'.

The source amplifier 120 serves to transmit image data by being connected to each channel of the display panel. The source amplifier 120 is driven according to the first control signal 'a' and the second control signal 'b' for driving the source amplifier of the DDI control unit 110. According to one or more examples, as shown at the bottom of FIG. 1, source amplifiers of the first to eighth source channels and seventeenth to twenty-fourth source channels are driven by the first control signal 'a', and source amplifiers of ninth to sixteenth source channels and twenty-fifth to thirty-second source channels are driven by the second control signal 'b'. While the source amplifiers of the first to eighth source channels and seventeenth to twenty-fourth source channels are driven by the first control signal 'a', source amplifiers of the ninth to sixteenth source channels and twenty-fifth to thirty-second source channels are in off-state. Conversely, while source amplifiers of the ninth to sixteenth source channels and the twenty-fifth to thirty-second source channels are driven by the second control signal 'b', source amplifiers of the first to eighth source channels and seventeenth to twenty-fourth source channels are in off-state.

In an example, the MUX 130 includes a plurality of switching elements to support a normal mode path and a test mode path. The switching elements perform switching operations by control operations of the DDI control unit 110. The switching elements included in the MUX 130 perform a switching operation according to the control of a third control signal 'c' of the DDI control unit 110. The switching elements of the MUX 130 provide a test path so that other source channels may be tested using a source driving pad (that is, test pad) of one source channel among the source channels included in one channel block in the test mode.

Specifically, in FIG. 1, the source driving pad 140 is connected to an output terminal of the source amplifier 120 for each of the source channels provided in the first to eighth channel blocks 210~280, and the MUX 130 is configured to include two switching elements between the output terminal of the source amplifier 120 and the source driving pad 140 and provide a normal mode path when the normal mode is set and provide a test mode path when the test mode is set.

Referring to FIG. 1, each of the first to eighth channel blocks 210~280 includes four source amplifiers and four source driving pads. For the convenience of description, referring to the first channel block 210, it is assumed that the first source amplifier, second source amplifier, third source amplifier, and fourth source amplifier are from the left side of FIG. 1. Similarly, it is assumed that the first source driving pad, second source driving pad, third source driving pad, and fourth source driving pad are formed from the left side of FIG. 1.

In an example, in the normal mode path, the first source amplifier transmits image data to the first source driving pad, the second source amplifier transmits image data to the second source driving pad, the third source amplifier transmits image data to the third source driving pad, and the fourth source amplifier transmits image data to the fourth source driving pad. Alternatively, in order to improve a slew rate, in the normal mode path, the first source amplifier transmits image data to the third source driving pad, the second source amplifier transmits image data to the second source driving pad, the third source amplifier transmits image data to the first source driving pad, and the fourth source amplifier may transmit image data to the fourth source driving pad.

The image data transmission scheme may also be applied to the second to eighth channel blocks 220~280.

Also, according to one or more examples, any one source driving pad of each of the first to eighth channel blocks 210~280 is designed to be externally short-circuited with source driving pads of other channel blocks. As shown in FIG. 1, the third source driving pad of each of the first to eighth channel blocks 210~280 is short-circuited and thus test paths for other source channels are provided. Specifically, the third source driving pad of the first channel block 210 and the eleventh source driving pad of the third channel block 230 are short-circuited; the seventh source driving pad of the second channel block 220 and the fifteenth source driving pad of the fourth channel block 240 are shorted; the nineteenth source driving pad of the fifth channel block 250 and the twenty-seventh source driving pad of the seventh channel block 270 are short-circuited; and the twenty-third source driving pad of the sixth channel block 260 and the thirty-first source driving pad of the eighth channel block 280 are short-circuited.

By such connection according to one or more examples, test paths of the first, second, and fourth source channels are provided through a source driving pad (that is, first test pad 212) of a third source channel of the first channel block 210; test paths of fifth, sixth, and eighth source channels are provided through a source driving pad (that is, second test pad 222) of a seventh source channel of a second channel block 220; test paths of the ninth, tenth, and twelfth source channels are provided through a source driving pad (that is, third test pad 232) of the eleventh source channel of the third channel block 230; test paths of thirteenth, fourteenth, and sixteenth source channels are provided through a source driving pad (that is, fourth test pad 242) of the fifteenth source channel of the fourth channel block 240; test paths of the seventeenth, eighteenth, and twentieth source channels are provided through a source driving pad (that is, fifth test pad 252) of the nineteenth source channel of the fifth channel block 250; test paths of twenty-first, twenty-second, and twenty-fourth source channels are provided through a source driving pad (that is, sixth test pad 262) of a twenty-third source channel of a sixth channel block 260; test paths of twenty-fifth, twenty-sixth, and twenty-eighth source channels are provided through a source driving pad (that is, seventh test pad 272) of the twenty-seventh source channel of the seventh channel block 270; and test paths of the twenty-ninth, thirtieth, and thirty-second source channels are provided through a source driving pad (that is, eighth test pad 282) of the thirty-first source channel of the eighth channel block 280.

In this way, the DDI device 100 of the present disclosure may perform a probe test using a smaller number of measurement units than in the conventional since it uses eight test pads 212, 222, 232, 242, 252, 262, 272, 282 and a plurality of test pads are short-circuited outside.

Referring to FIG. 1, test equipment (not shown) is connected to an output terminal of the source driving pad 140. The test equipment may include first to fourth measurement units 310, 320, 330, 340 for a probe test. Each of the measurement units 310, 320, 330, 340 performs a probe test on channels of short-circuited channel blocks. Specifically, the first measurement unit 310 is connected to the first channel block 210 and the third channel block 230; the second measurement unit 320 is connected to the second channel block 220 and the fourth channel block 240; the third measurement unit 330 is connected to the fifth channel block 250 and the seventh channel block 270; and the fourth measurement unit 340 is connected to the sixth channel block 260 and the eighth channel block 280. That is, one measurement unit performs a probe test in which a test pad of any one channel block and a test pad of a channel block adjacent to the one channel block are short-circuited by a first control signal 'a' or a second control signal 'b'.

Figure 2:
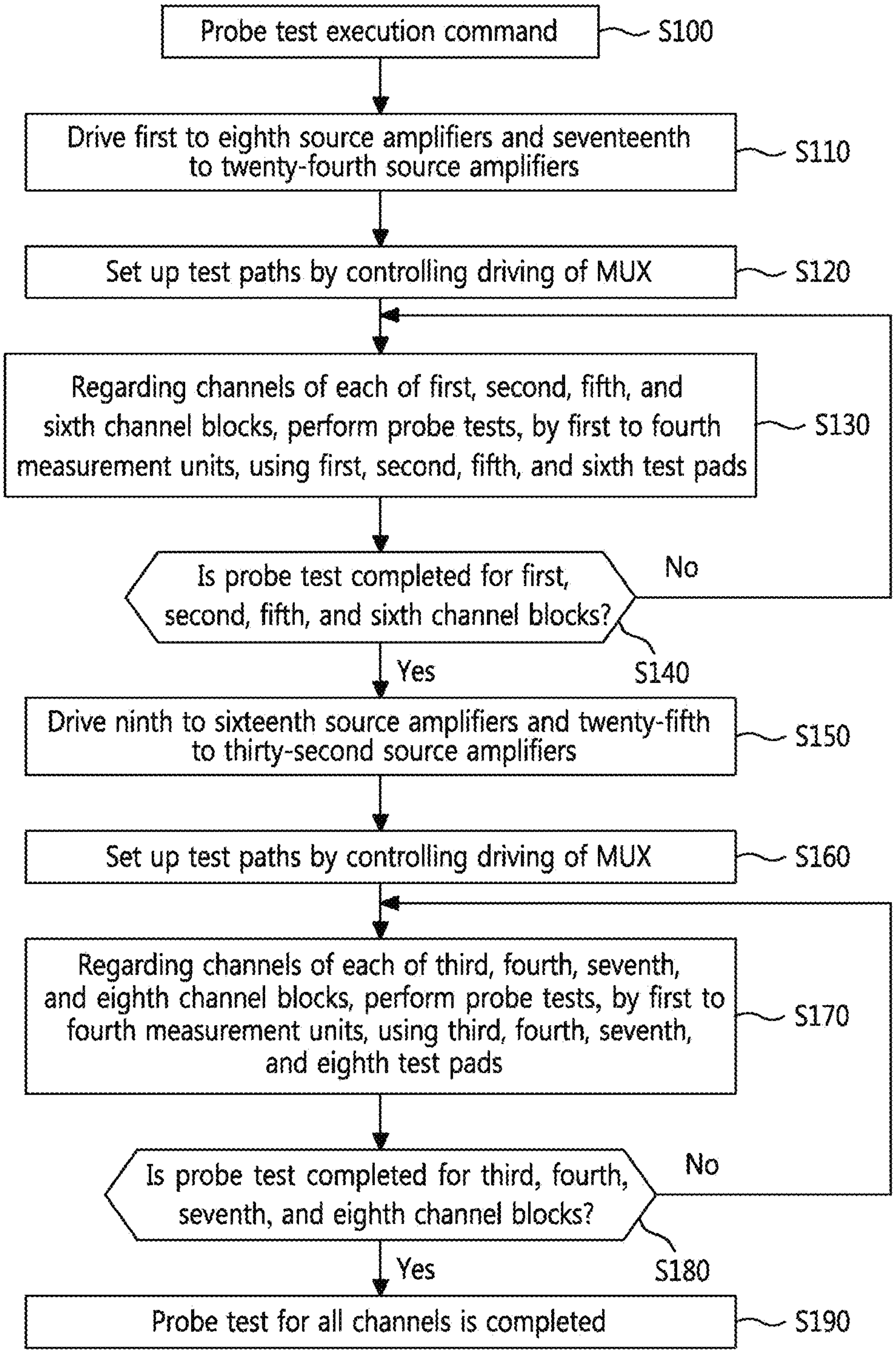
FIG. 2 illustrates a schematic flow chart for explaining a process of performing a probe test using the display driving IC device of FIG. 1 according to one or more examples of the present disclosure.

FIG. 2 illustrates a schematic flow chart for explaining a process of performing a probe test using the display driving IC device of FIG. 1 according to one or more examples of the present disclosure.

A probe test execution command is generated (S100). Then, the DDI control unit 110 drives first to eighth source amplifiers and seventeenth to twenty-fourth source amplifiers by using the first control signal 'a'(S110). The remaining ninth to sixteenth source amplifiers and twenty-fifth to thirty-second source amplifiers become in off-state without a separate control signal or are maintained in off-state by the second control signal 'b'. At the same time, the DDI control unit 110 sequentially controls the switching elements of the MUX 130 at the output terminal of the source amplifier, which is currently in the drive-on state, to establish test paths (S120).

The first to fourth measurement units 310, 320, 330, 340 perform a probe test (S130). Each of the first to fourth measurement units 310, 320, 330, 340 sequentially performs the probe test on the source channels of first, second, fifth, and sixth channel blocks 210, 220, 250, 260 that are currently in drive-on state.

Specifically, the first measurement unit 310 performs a probe test on a first source channel of the first channel block 210 through the first test pad 212; the second measurement unit 320 performs a probe test on a fifth source channel of the second channel block 220 through the second test pad 222; the third measurement unit 330 performs a probe test on a seventeenth source channel of the fifth channel block 250 through the fifth test pad 252; and the fourth measurement unit 340 performs a probe test on a twenty-first source channel of the sixth channel block 260 through the sixth test pad 262.

When a probe test on each first source channel of the channel blocks 210, 220, 250, 260 in drive-on state is completed, then, a probe test on each second source channel is performed. Specifically, the first measurement unit 310 performs a probe test on the second source channel of the first channel block 210 through the first test pad 212; the second measurement unit 320 performs a probe test on a sixth source channel of the second channel block 220 through the second test pad 222; the third measurement unit 330 performs a probe test on a eighteenth source channel of the fifth channel block 250 through the fifth test pad 252; and the fourth measurement unit 340 performs a probe test on a twenty-second source channel of the sixth channel block 260 through the sixth test pad 262.

The probe test will be repeatedly performed until the fourth measurement unit 340 performs a probe test on the twenty-fourth source channel of the sixth channel block 260 through the sixth test pad 262. When the probe test on the twenty-fourth source channel is finished, the DDI control unit 110 recognizes that the probe test on the channel block 210, 220, 250, 260 currently in drive-on state is completed (S140).

The DDI control unit 110 drives ninth to sixteenth source amplifiers and twenty-fifth to thirty-second source amplifiers using the second control signal 'b' (S150). The first to eighth source amplifiers and seventeenth to twenty-fourth source amplifiers previously in drive-on state become in off-state. At the same time, the DDI control unit 110 sequentially controls the switching elements of the MUX 130 at the output terminal of the source amplifiers currently in drive-on state to set up a test path (S160).

The first to fourth measurement units 310, 320, 330, 340 perform a probe test (S170). The probe test is performed sequentially by the first to fourth measurement units 310, 320, 330, 340 for each source channel of third, fourth, seventh, and eighth channel blocks 230, 240, 270, 280 that is currently in a drive-on state.

Specifically, the first measurement unit 310 performs a probe test on ninth source channel of the third channel block 230 through a third test pad 232; the second measurement unit 320 performs a probe test on a thirteenth source channel of the fourth channel block 240 through a fourth test pad 242; the third measurement unit 330 performs a probe test on the twenty-fifth source channel of the seventh channel block 270 through a seventh test pad 272; and the fourth measurement unit 340 performs a probe test on the twenty-ninth source channel of the eighth test block 280 through an eighth test pad 282.

According to one or more examples, when the probe test on the first channel of the third, fourth, seventh, and eighth channel blocks 230, 240, 270, 280 in drive-on state is completed, the probe test on the second channel is performed. Specifically, the first measurement unit 310 performs a probe test on the tenth source channel of the third channel block 230 through the third test pad 232; the second measurement unit 320 performs a probe test on the fourteenth source channel of the fourth channel block 240 through the fourth test pad 242; the third measurement unit 330 performs a probe test on the twenty-sixth source channel of the seventh channel block 270 through the seventh test pad 272; and the fourth measurement unit 340 performs a probe test on the thirtieth source channel of the eighth channel block 280 through the eighth test pad 282.

The probe test will continue to be repeated until the fourth measurement unit 340 performs a probe test on the thirty-second source channel of the eighth channel block 280 through the eighth test pad 282.

When the probe test on the third, fourth, seventh, and eighth channel blocks 230, 240, 270, 280 currently in drive-on state is completed (S180), the DDI control unit 110 determines that the probe test on all channels is completed (S190).

Figure 3:
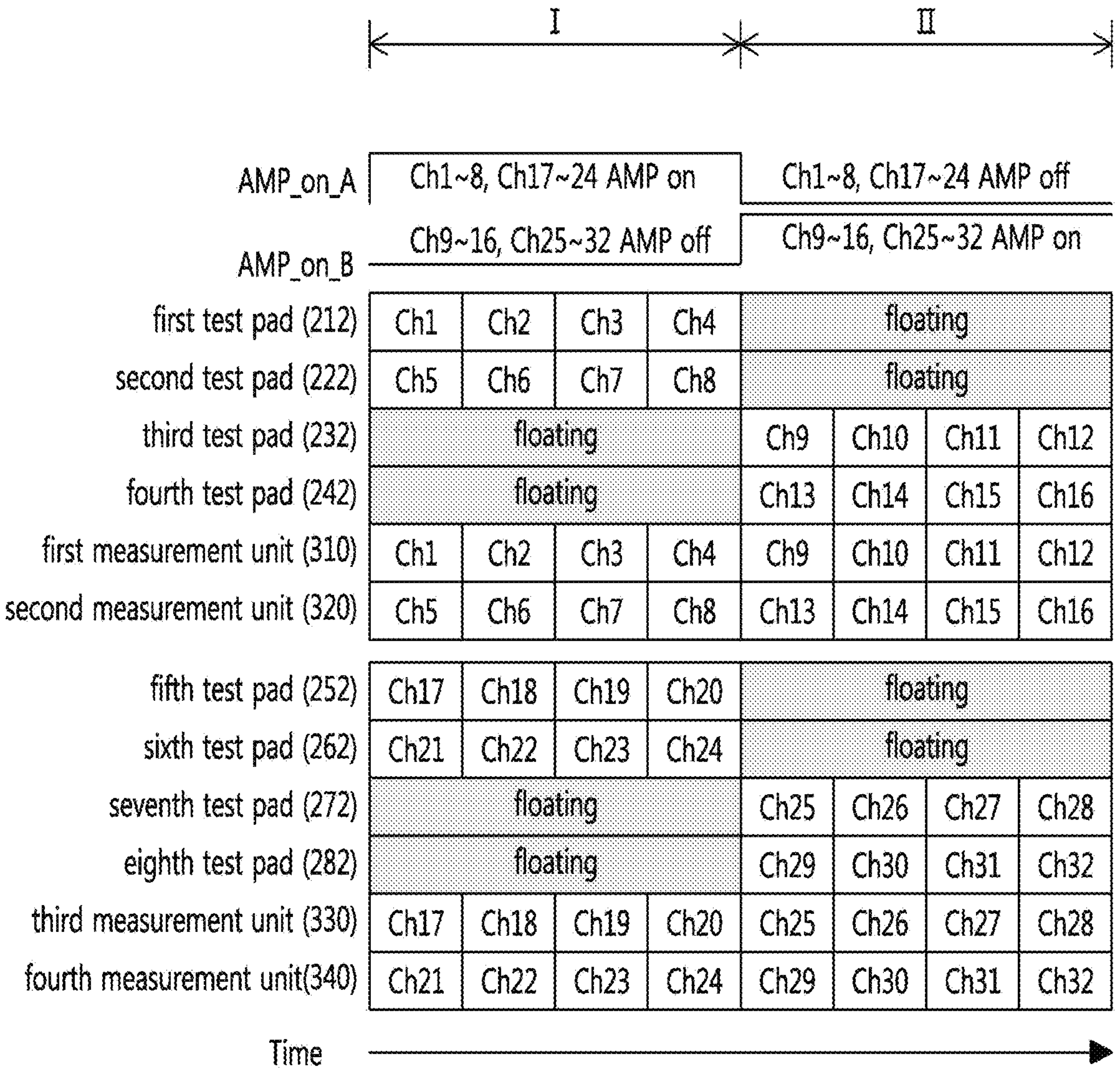
FIG. 3 illustrates a timing diagram when performing a probe test according to one or more examples of the present disclosure.

FIG. 3 illustrates a timing diagram when performing a probe test according to one or more examples of the present disclosure.

Referring to 'I' of the timing diagram, first to eighth source amplifiers and seventeenth to twenty-fourth source amplifiers are in on-state by a first control signal 'a' AMP_on_A, and ninth to sixteenth source amplifiers and twenty-fifth to thirty-second source amplifiers become in off-state by a second control signal 'b' AMP_on_B.

According to one or more examples, the probe test is performed through a first test pad 212 for the first to fourth source channels including source amplifiers in on-state, and the probe test is performed through a second test pad 222 for fifth to eighth source channels. At this time, since the third channel block 230 and the fourth channel block 240 are in off-state, the third test pad 232 and the fourth test pad 242 have a floating state. The probe tests on the first to fourth source channels are performed by a first measurement unit 310, and the probe tests on the fifth to eighth source channels are performed by a second measurement unit 320.

Similarly, for the seventeenth to twentieth channels including source amplifiers in on-state, the probe test is performed through a fifth test pad 252, and for twenty-first to twenty-fourth channels, the probe test is performed through a sixth test pad 262. At this time, since a seventh channel block 270 and an eighth channel block 280 are in off-state, a seventh test pad 272 and an eighth test pad 282 have a floating state. The probe tests on seventeenth to twentieth channels are performed by a third measurement unit 330, and the probe tests on twenty-first to twenty-fourth channels are performed by a fourth measurement unit 340.

Referring to 'II' of the timing diagram, first to eighth source amplifiers and seventeenth to twenty-fourth source amplifiers are in off-state by a first control signal 'a' AMP_on_A, and ninth to sixteenth source amplifiers and twenty-fifth to thirty-second source amplifiers are in on-state by a second control signal 'b' AMP_on_B.

According to one or more examples, for the ninth to twelfth source channels including source amplifiers in on-state, the probe test is performed through the third test pad 232. For the thirteenth to sixteenth source channels, the probe test is performed through the fourth test pad 242. At this time, since the first channel block 210 and the second channel block 220 are in off-state, the first test pad 212 and the second test pad 222 have a floating state. The probe tests on ninth to twelfth source channels are performed by the first measurement unit 310, and the probe tests on thirteenth to sixteenth source channels are performed by the second measurement unit 320.

Similarly, for twenty-fifth to twenty-eighth source channels including source amplifiers in on-state, the probe test is performed through a seventh test pad 272; and for twenty-ninth to thirty-second source channels, the probe test is performed through a eighth test pad 282. At this time, since fifth channel block 250 and sixth channel block 260 are in off-state, the fifth test pad 252 and sixth test pad 262 have a floating state. The probe tests on twenty-fifth to twenty-eighth source channels are performed by a third measurement unit 330, and the probe tests on twenty-ninth to thirty-second source channels are performed by a fourth measurement unit 340.

In this way, it may be seen that the probe test may be performed with a test equipment having a smaller number of measurement units compared to the source driving pads by selectively providing test paths through a test pad of one source channel preset for a plurality of source channels provided in each channel block, and at the same time, configuring the test pad of one channel block to be short-circuited with test pads of other channel blocks.

Figure 4:
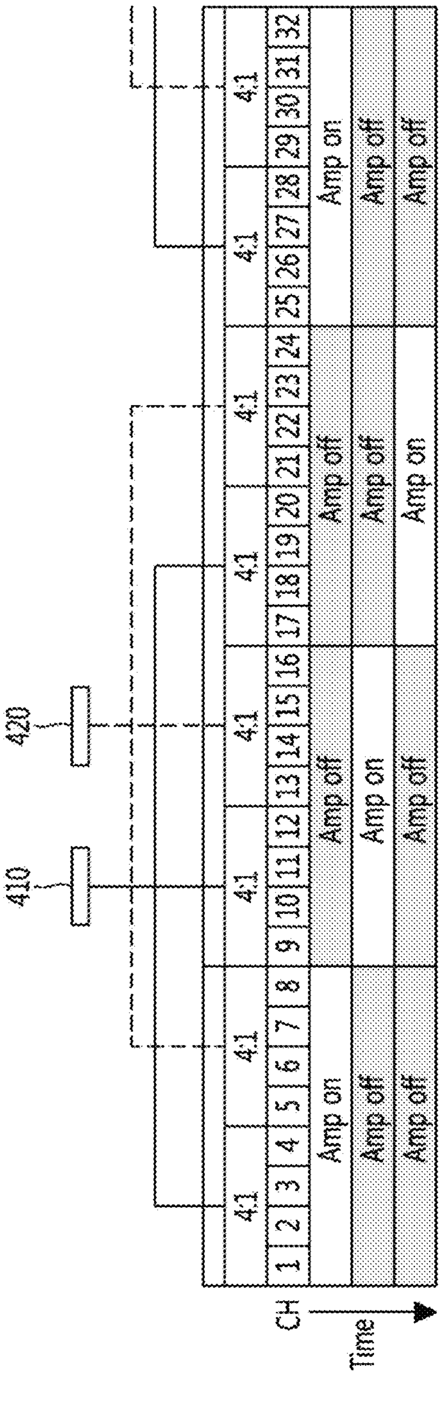
FIGS. 4 and 5 illustrate configuration diagrams of a display driving IC device according to another example of the present disclosure.
Figure 5:
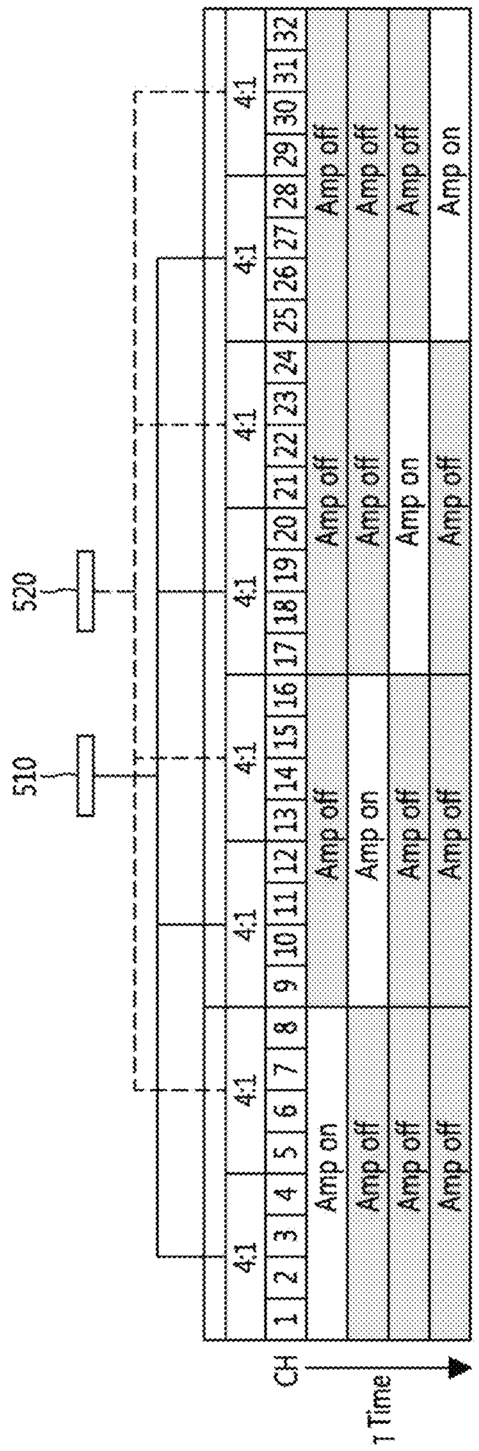

FIGS. 4 and 5 illustrate configuration diagrams of a display driving IC device according to another example of the present disclosure.

FIG. 4 illustrates a test circuit set to 12:1. It means that one measurement unit performs a probe test on twelve source channels. Referring to FIG. 4, a first measurement unit 410 is connected to a first channel block, third channel block, and fifth channel block; and a second measurement unit 420 is connected to a second channel block, fourth channel block, and sixth channel block.

As a probe test method, DDI control unit 110 (see FIG. 1) drives the first channel block and second channel block, the first measurement unit 410 sequentially performs probe tests on source channels of the first channel block, and the second measurement unit 420 sequentially performs probe tests on source channels of the second channel block.

Upon completion of probe tests on all source channels of the first and second channel blocks, the third channel block and the fourth channel block are driven. Further, probe tests on channels of the third and fourth channel blocks are performed by operation of the first measurement unit 410 and second measurement unit 420.

After probe tests on all source channels of the third and fourth channel blocks are performed, the fifth channel block and sixth channel block are driven. Thereafter, probe tests on the channels of the fifth channel block and sixth channel blocks are performed by operation of the first measurement unit 410 and second measurement unit 420.

FIG. 5 illustrates a test circuit set to 16:1 according to one or more examples of the present disclosure. The test circuit of FIG. 5 differs from FIGS. 1 and 4 only in that one measurement unit 510, 520 is configured to perform a probe test on sixteen source channels, the probe test method is performed in the same way as described in FIGS. 1 and 4. Therefore, description of the probe test method of FIG. 5 will be omitted.

According to one or more examples of the present disclosure, even when the number of source driving pads increases as the resolution of the display device increases, probe tests may be performed using test equipment having fewer measurement units.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A display driving IC device, comprising:

a first channel block to an $N^{th}$ channel block, each channel block including M source amplifiers, N and M being integers;

source driving pads, each of the source driving pads being connected to the M source amplifiers;

a multiplexer configured to alternately output data from the source amplifiers in a normal mode and selectively provide a test mode path in a test mode, so that a probe test is sequentially performed on a plurality of source amplifiers for each of the first to $N^{th}$ channel blocks through a test pad selected from the source driving pads; and a control unit configured to control driving of the source amplifiers and the multiplexer, wherein the multiplexer is configured to include two switching elements disposed between an output terminal of each source amplifier and a corresponding one of the source driving pads, and to provide a normal mode path when the normal mode is set, wherein, in test mode, the multiplexer is configured to provide the test mode path, such that each source amplifier in the first through $N^{th}$ channel blocks is sequentially connected to the test pad, and the probe test is performed under control of the multiplexer, wherein test pads of odd channel blocks adjacent to each other among the first to $N^{th}$ channel blocks are shorted to an exterior of the display driving IC device, wherein test pads of even channel blocks adjacent to each other among the first to $N^{th}$ channel blocks are shorted to the exterior of the display driving IC device, wherein each pair of channel blocks whose test pads are shorted to each other defines a short-connected pair of channel blocks, wherein one channel block of the short-connected pair of channel blocks is in an on-state in which test may be performed, and wherein the other channel block of the short-connected pair of channel blocks is in an off-state awaiting testing.

2. The display driving IC device of claim 1, wherein the M is 4, and wherein in the test mode, the test pad is a source driving pad connected to a third source amplifier of each channel block.

3. The display driving IC device of claim 1, wherein test pads each are in contact with measurement units of a test equipment.

4. The display driving IC device of claim 1, wherein after testing of a source channel provided in one channel block of the short-connected pair of channel blocks is completed, testing of a source channel provided in the other channel block of the short-connected pair of channel blocks is performed.

5. The display driving IC device of claim 1, wherein the M is 4, and wherein, in normal mode, a source amplifier alternates data output between adjacent odd source driving pads.

6. The display driving IC device of claim 1, wherein a source amplifier of a channel block being tested is in a drive-on state, and wherein a test pad connected to a source channel of other channel blocks to be untested maintains a floating state.

7. The display driving IC device of claim 1, wherein the control unit is configured to control driving of the multiplexer such that a source channel is connected to the test pad when a channel block is in an on-state.

8. A method for performing a probe test using a display driving IC, the method comprising:

externally shorting third test pads of adjacent odd-numbered channel blocks among a first channel block through an $N^{th}$ channel block, the odd-numbered channel blocks including first, third, fifth, and seventh channel blocks, each channel block including M source amplifiers, a multiplexer, and source driving pads, N and M being integers, and externally shorting third test pads of adjacent even-numbered channel blocks among the first through the $N^{th}$ channel blocks, the even-numbered channel blocks including second, fourth, sixth, and eighth channel blocks, wherein the third test pads of the first and third channel blocks, the second and fourth channel blocks, the fifth and seventh channel blocks, and the sixth and eighth channel blocks are externally shorted, respectively;

driving-on any one of the shorted pairs of the channel blocks; and sequentially testing source channels of the channel blocks that have been driven-on by each measurement unit of a test equipment using the third test pads selected from the source driving pads, wherein the multiplexer is configured to include two switching elements disposed between an output terminal of each source amplifier and a corresponding one of the source driving pads, and to provide a normal mode path when a normal mode is set, and wherein, in a test mode, the multiplexer is further configured to provide a test mode path such that each source amplifier in the first through $N^{th}$ channel blocks is sequentially connected to the third test pads to perform the probe test under control of the multiplexer.

9. The method of claim 8, wherein the third test pads included in a remaining channel block of the shorted pairs of channel blocks are floated.

10. The method of claim 8, further comprising:

when testing is completed for source channels of channel blocks in a drive-on state, driving-on channel blocks including the third test pads in floating state, and sequentially testing source channels of each channel block using the third test pads in the corresponding channel block.

11. The method of claim 8, wherein the testing comprises:

performing a test with a measurement unit connected to the third test pads while switching and driving the multiplexer of each channel block, and sequentially connecting the third test pads and source amplifiers included in each channel block.

12. A method for performing a probe test using a display driving IC comprising a first channel block to an $N^{th}$ channel block, each channel block including M source amplifiers, a multiplexer, and source driving pads, N and M being integers, the method comprising:

performing a first test process, the first test process comprising:

connecting a first measurement unit to a first channel block and a third channel block;

connecting a second measurement unit to a second channel block and a fourth channel block;

connecting a third measurement unit to a fifth channel block and a seventh channel block; and connecting a fourth measurement unit to a sixth channel block and an eighth channel block; and sequentially performing a probe test, by the third test pads selected from the source driving pads, on source channels provided in each of the first channel block, second channel block, fifth channel block, and sixth channel block, starting from a first source channel, wherein the multiplexer is configured to include two switching elements disposed between an output terminal of each source amplifier and a corresponding one of the source driving pads, and to provide a normal mode path when a normal mode is set, wherein, in a test mode, the multiplexer is further configured to provide a test mode path such that each source amplifier in the first through $N^{th}$ channel blocks is sequentially connected to the third test pads to perform the probe test under control of the multiplexer, and wherein the third test pads of the first and third channel blocks, the second and fourth channel blocks, the fifth and seventh channel blocks, and the sixth and eighth channel blocks are externally shorted, respectively.

13. The method of claim 12, further comprising:

performing a second test process, the second test process comprising:

when the first test process is completed, performing a probe test, by the first to fourth measurement units, on source channels provided in each of the third channel block, fourth channel block, seventh channel block, and eighth channel block, starting from a first source channel.

14. The method of claim 13, wherein the first test process and the second test process are performed while sequentially connecting the third test pads and source amplifiers based on switching and driving of a multiplexer provided in each channel block.

15. The method of claim 12, wherein, when each source amplifier in the first channel block, second channel block, fifth channel block, and sixth channel block is in a drive-on state, each source amplifier in the third channel block, fourth channel block, seventh channel block, and eighth channel block is in a drive-off state.

16. The method of claim 12, wherein, when each source amplifier in the third channel block, fourth channel block, seventh channel block, and eighth channel block is in a drive-on state, each source amplifier in the first channel block, second channel block, fifth channel block, and sixth channel block is in a drive-off state.

* * * * *